United States Patent
Johansen

(10) Patent No.: US 11,260,543 B2
(45) Date of Patent: Mar. 1, 2022

(54) CLAMPED FLANGE JOINT

(71) Applicant: Universal Robots A/S, Odense (DK)

(72) Inventor: Steffen Johansen, Odense (DK)

(73) Assignee: UNIVERSAL ROBOTS A/S, Odense (DK)

( * ) Notice: Subject to any disclaimer, the term of this patent is extended or adjusted under 35 U.S.C. 154(b) by 110 days.

(21) Appl. No.: 16/473,018

(22) PCT Filed: Jan. 3, 2018

(86) PCT No.: PCT/EP2018/050144
§ 371 (c)(1),
(2) Date: Jun. 24, 2019

(87) PCT Pub. No.: WO2018/130447
PCT Pub. Date: Jul. 19, 2018

(65) Prior Publication Data
US 2020/0391393 A1 Dec. 17, 2020

(30) Foreign Application Priority Data

Jan. 13, 2017 (EP) ..................................... 17151442

(51) Int. Cl.
*B25J 9/08* (2006.01)
*B25J 17/02* (2006.01)
(Continued)

(52) U.S. Cl.
CPC ................. *B25J 17/02* (2013.01); *B25J 9/08* (2013.01); *B25J 15/0408* (2013.01); *B25J 18/00* (2013.01);
(Continued)

(58) Field of Classification Search
CPC . B25J 9/08; B25J 15/0408; B25J 17/02; B25J 19/0033; B25J 19/425; F16D 1/033
(Continued)

(56) References Cited

U.S. PATENT DOCUMENTS 2,092,704 A * 9/1937 Ricefield ................... F16D 3/68
464/76
2,195,492 A * 4/1940 McDonald ............ F16L 37/252
285/330
(Continued)

FOREIGN PATENT DOCUMENTS

WO 2004/001249 A1 12/2003
WO WO-2004/001249 A1 12/2003
(Continued)

OTHER PUBLICATIONS

International Search Report for PCT/EP2018/050144, 6 pages (dated Jun. 24, 2019).
(Continued)

*Primary Examiner* — William C Joyce
(74) *Attorney, Agent, or Firm* — Burns & Levinson LLP

(57) ABSTRACT

A releasable joint between two component flanges is for use in a robot arm. The flanges have a number of teeth on each part that is pressed into contact by clamps, screws or other means. The releasable joint assembly is suitable for establishing a robot joint between a first and second component each having interlocking annular flange with respective contact surfaces, and where these flanges are held in place by a clamp.

20 Claims, 7 Drawing Sheets

(51) Int. Cl.
*B25J 15/04* (2006.01)
*B25J 18/00* (2006.01)
*B25J 19/00* (2006.01)
*G05B 19/425* (2006.01)
*F16D 1/033* (2006.01)

(52) U.S. Cl.
CPC .......... *B25J 19/0033* (2013.01); *F16D 1/033* (2013.01); *G05B 19/425* (2013.01)

(58) Field of Classification Search
USPC ................... 74/490.06; 403/338; 464/182
See application file for complete search history.

(56) References Cited

U.S. PATENT DOCUMENTS

| | | | | |
|---|---|---|---|---|
| 2,303,031 | A * | 11/1942 | Dusevoir | F16D 1/033 403/364 |
| 2,303,032 | A * | 11/1942 | Dusevoir | F16D 1/076 403/332 |
| 3,744,577 | A * | 7/1973 | Williams | E21B 3/02 173/213 |
| 4,053,248 | A * | 10/1977 | Schultenkamper | F16D 1/076 403/337 |
| 4,543,011 | A * | 9/1985 | Lindenthal | F16D 1/033 403/338 |
| 4,821,818 | A * | 4/1989 | Mefferd | E21B 17/046 175/323 |
| 5,048,871 | A * | 9/1991 | Pfeiffer | E21B 17/043 285/39 |
| 5,269,572 | A * | 12/1993 | Mefferd | E21B 17/046 285/330 |
| 8,025,579 | B2 * | 9/2011 | Kamikawa | B60B 27/0031 464/178 |
| 8,079,773 | B2 * | 12/2011 | Blanton | F16L 47/14 403/335 |
| 8,614,559 | B2 | 12/2013 | Kassow et al. | |
| 8,779,715 | B2 | 7/2014 | Kassow et al. | |
| 9,248,573 | B2 | 2/2016 | Soe-Knudsen et al. | |
| 9,505,136 | B1 | 11/2016 | Nusser et al. | |
| 9,833,897 | B2 | 12/2017 | Soe-Knudsen et al. | |
| 2007/0151410 | A1 * | 7/2007 | Meggiolan | B62M 3/003 74/594.1 |
| 2013/0231778 | A1 | 9/2013 | Ostergaard | |

FOREIGN PATENT DOCUMENTS

| | | |
|---|---|---|
| WO | 2011/091096 A2 | 7/2011 |
| WO | WO-2011/091096 A2 | 7/2011 |

OTHER PUBLICATIONS

Written Opinion for PCT/EP2018/050144, 5 pages (dated Jun. 24, 2019).
European Union Intellectual Property Office Certificate of Registration for No. 005271822-0001, 8 pages (dated May 18, 2018).
European Union Intellectual Property Office Certificate of Registration for No. 005272283-0001, 8 pages (dated May 18, 2018).
European Union Intellectual Property Office Certificate of Registration for No. 005272283-0002, 8 pages (dated May 18, 2018).
European Union Intellectual Property Office Certificate of Registration for No. 005272283-0003, 8 pages (dated May 18, 2018).
International Search Report for PCT/EP2018/050144, issued by ISA/EP, 6 pages (dated Apr. 12, 2018).
Written Opinion for PCT/EP2018/050144, issued by ISA/EP, 5 pages (dated Apr. 12, 2018).
Communication pursuant to Article 94(3) EPC for European Patent Application No. 17151442.5, dated May 4, 2021, (5 pages).
Examination Report for Taiwan Patent Application No. 106145070, dated Oct. 7, 2021, with translation (13 pages).

* cited by examiner

CLAMPED FLANGE JOINT

CROSS-REFERENCE TO RELATED APPLICATIONS

This U.S. patent application is a U.S. national stage entry of POT Application No. PCT/EP2018/050144 filed on Jan. 8, 2018. The contents of PCT/EP2018/050144 are incorporated herein by reference. PCT/EP2018/050144 claims priority to European Patent Application No. EP17151442.5 filed on Jan. 13, 2017. The contents of European Patent Application No. EP17151442.5 are incorporated herein by reference. This U.S. patent application claims priority to both POT Application No. PCT/EP20181050144 and to European Patent Application No. EP17151442.5.

FIELD OF THE INVENTION

The present invention relates to a releasable joint between two component flanges. More specifically, the flanges have a number of teeth on each part that is pressed into contact by clamps, screws or other means.

BACKGROUND OF THE INVENTION

In order to enhance versatility many robotic systems are constructed in modular form. Any number of various modules can be assembled together as may be needed to arrive at a system arrangement desirable for accomplishing the task required at the time. Subsequently, the system can be reconstructed with a different arrangement of modules for a different task.

The modules of systems of this type are interconnected in sequential fashion until the correct combination is achieved to obtain the types and ranges of movement necessary for the task. If a wide range of movement is required, sufficient modules are added until the construction is sufficient for accomplishing the movement.

A variety of robotic mechanisms are known in the art particularly for use in automated performance of various manufacturing processes and the like, Such robotic mechanisms typically comprise an assembly of mechanical components. The assembled components commonly comprise a mechanical linkage which supports a so-called end effector or tool for displacement through a desired path of motion. Such robotic mechanisms have been constructed with relatively simple securing means (e.g. nuts and bolts).

In a modular robotic system, the joints can be arranged, or configured, differently. As a result, there are multiple possible robot structures for the same number of modular joints. Based on the task to be accomplished by a modular robotic system; the user would interconnect certain number of modules to form a desired system. The system may consist of one or more mechanisms (robotic arms, or manipulators). Then, the user would connect the control system to program the motion and actions in accordance with the task specification.

WO1999001261 covers a method to assemble 2 robotic joints. The method is however depending on high surface pressure and the here from originating friction between the 2 parts or very tight production tolerances to support the necessary loads.

The limitations on available systems are based on the manner in which the modules have been constructed. A quick and reliable system is needed for interconnecting the modules.

It is an object of the present invention to provide a novel coupling system for interconnecting the modules in a quick and efficient manner to facilitate easy tailoring of the manipulator assembly to that required to perform a particular assigned task.

SUMMARY OF THE INVENTION

In accordance with the invention; a modular coupling suitable for a robotic system is provided. In accordance with the invention, the robotic system includes a robotic arm to receive position command signals from a central processor. The present invention differs from the above mentioned prior art in that it makes use of angled contact faces between the 2 flanges, which enables assembly in a rigid manner of the 2 flanges and lock all 6 degrees of freedom in a single step without the need for tight production tolerances.

Specifically the present invention provides a releasable joint assembly suitable for establishing a robot joint comprising:
- a first component having a first annular flange with a first contact surface provided with teeth distributed, preferably evenly, along the circumference of the flange;
- a second component having a second annular flange with a second contact surface provided with cavities distributed, preferably evenly, for receiving the teeth along the circumference of the flange;
- a clamp for holding the first and second components in place;
wherein the angle of the contact faces of the teeth have the same angle as the contact faces of the cavities so that the first and second flanges fit together, whereby the clamp holds the first and second components in a non-compressible joint, and wherein the peaks of said teeth do not touch the bottoms of said cavities.

Hence the two components are locked together because of the contact faces (preferably V-shaped) that are kept in contact, thus securing the parts are unable to move relative to each other. Advantageously the connection is not dependent on friction (only direct mechanical contact) thereby being able to transmit large forces from one part to the other without slipping. This is true in all directions for both translation and rotation. The connection is not dependent on precise production tolerances since the V-shaped teeth will always fall into direct contact because of the angled contact faces. The teeth are not in contact in top and bottom.

It should also be noted that forces can be transmitted from one component to the other in the perimeter of the components at a large radius, thereby minimizing the need for heavy and costly material in the center of the components to withstand forces.

It is a further advantage that the connection can be assembled with as little as a single screw depending on the design of the V-clamps or other means to keep the angled contact faces in contact.

The angle of the contact faces can be adjusted to optimize the connection to different load cases, material combinations etc. However, the angle of the contact faces is preferably 15-75 degrees, and more preferably 20-45 degrees.

In a preferred embodiment of the present invention the first and second components are made from metals or metal alloys. In one embodiment of the invention the first and second components have different hardness.

In a particularly practically viable embodiment one of the teeth is wider or narrower than the remaining teeth or one of the teeth has a non-uniform distance or height between teeth to ensure correct connection between the components.

When assembling an industrial robot there is a number of parts to be fixed together in order to make the complete functional robot. These parts are typically robotic joints which generate the movement of the robot and spacers in between the joints which only acts to have distance between the moving joints. The present invention provides a simple and robust means for establishing the connections between the joints.

Traditional assembly with a ring of screws and nuts is time consuming to assemble because of the typically high number of screws to be tightened individually. This causes a problem especially in modular robotic systems, where the modules are assembled and disassembled more than once. Also for service and repair this is undesirable. The clamped flange joint can is be assembled in very short time by placing the clamps around the flanges and tightening with as little as a single screw. Access to the screw or screws in the clamps is easy as they are sitting tangentially in the clamp perimeter. One advantage of the clamped flange joint is that as soon as one of the clamps is put in place, the connection is stable and the connected parts are supported sufficiently so the operator have both hands free to insert and tighten the screws. Another advantage is that the tightening torque of the screws have very wide limits, as the connection will be fully functional in a wide range of screw force. This is generally not the case with traditional screw connections between robotic parts that are dependent on tight limits for screw torque.

In robotic systems it is beneficial to have high strength and low weight of the assembled robot in order to optimize the pay load of the robot. This is made possible by using the clamped flange joint invention, because the material use can be kept low while still having a rigid and fully locked connection. The forces are transferred at the outer diameter of the tubes and joints, which minimizes material use. The use of V-shaped teeth and V-shaped clamps makes it possible to use relatively low clamp forces and still be able to transfer very high torque and bending moments. The rigidity of the clamped flange joint is very high because the transfer of forces happens on the outer diameter of the parts. This is an important feature for most applications and especially in robotics to improve the absolute position of the working robot.

DETAILED DESCRIPTION OF THE INVENTION

Figure 1:
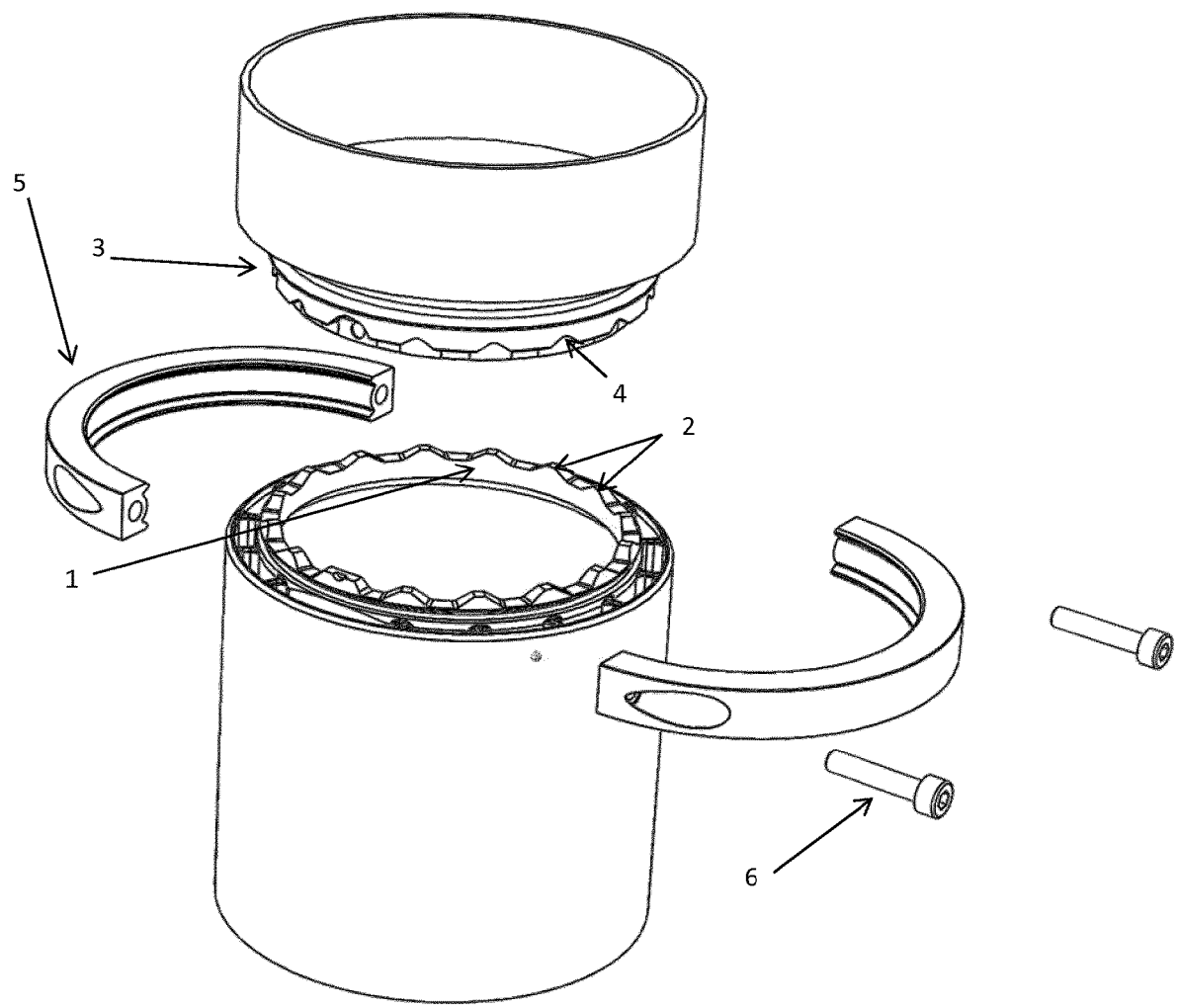
FIG. 1 shows a joint assembly according to the present invention.
Figure 2:
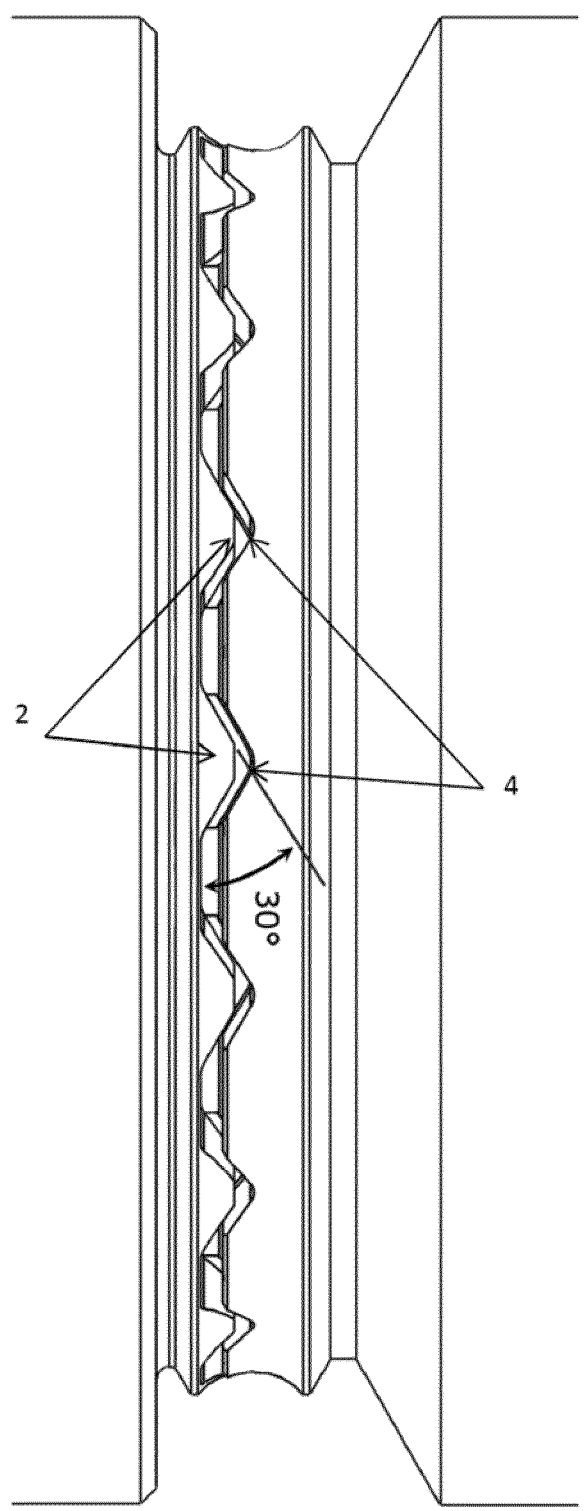
FIG. 2 shows an enlarged view of this assembly.

Referring to FIG. 1 there is shown a joint assembly according to the present invention. Referring to FIG. 2 there is shown an enlarged view of this assembly from which the interaction between the teeth of the respective flanges can be derived. In accordance with the reference numerals shown in FIGS. 1 to 3 the following description serves to enable a skilled person to work the invention.

Without being limited to the field of robotic joints the present invention is particularly suitable for quickly establishing a rigid and ruggedized robot joint between two flanges. Specifically this is achieved by a first annular flange (1) with a first contact surface provided with evenly distributed teeth (2) along the circumference of the flange, and which flange (1) may be secured to a second annular flange (3) with a second contact surface provided with evenly distributed cavities (4) for receiving the teeth (3) along the circumference of that flange (3).

In order to hold the flanges in place a user can easily mount a clamp (5) for safely securing the joint. As shown in FIG. 2 the angle of the contact faces of the teeth (2) have substantially the same angle as the contact faces of the cavities (4) so that the first and second flanges fit together. In FIG. 2 an angle of 30 degrees is shown.

Figure 3:
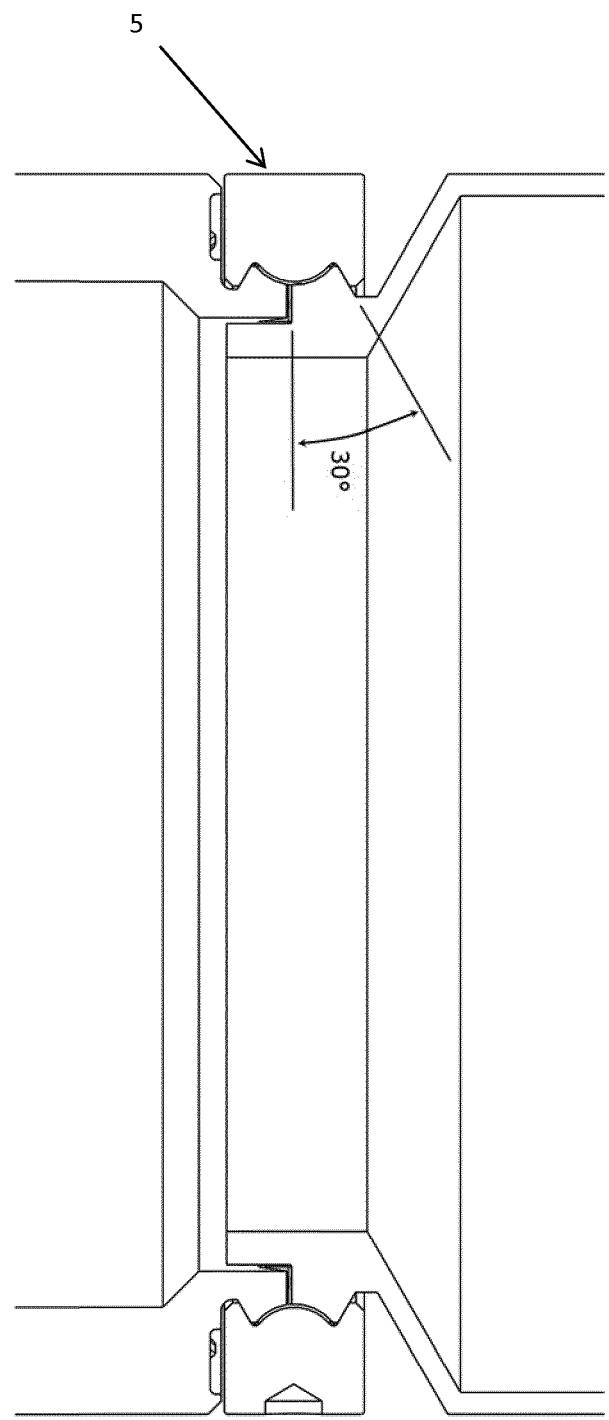
FIG. 3 shows an enlarged view of the V-clamp holding the flanges in place.

The exact design of the teeth and V-clamps can be adapted to the specific application. Meanwhile a preferred configuration is shown in FIG. 3 showing an angle of 30 degrees between the plane dividing the two flanges and the contact surface holding one of the flanges in place. The V-clamp referred to herein is commonly known (also as V-Band Clamps/Couplings) and offer effective fastening solutions in a wide range of applications. Because V-clamp couplings can be easily assembled and disassembled, they are often used on equipment that requires frequent service or maintenance.

A higher number of teeth will generally raise the connections ability to transfer high loads. The angle of the teeth can be used to control the relationship between the connections strength for moment forces around the center axis and bending forces. The angle of the V-clamps can be adapted to the application. In general a flatter angle raises the load carrying ability, but requires a stronger clamp, and vice versa. In a preferred embodiment of the invention the angle of both the teeth and the V-clamps are 30° from horizontal which is represents a good design for most applications. The preferred design of the V-clamps is 2 halves each covering 180° perimeter of the flanges. These 2 clamps are held together by 2 screws (6). Another possibility is to connect 2 or more clamps into a chain with pins or other method, so that only 1 screw is necessary to tighten the clamps around the connection. Yet another possibility is to use an eccentric tightening principle with a permanent handle so the connection can be made without using tools. This system is known from V-clamps in pipe systems that can be quickly coupled.

Figure 4A:
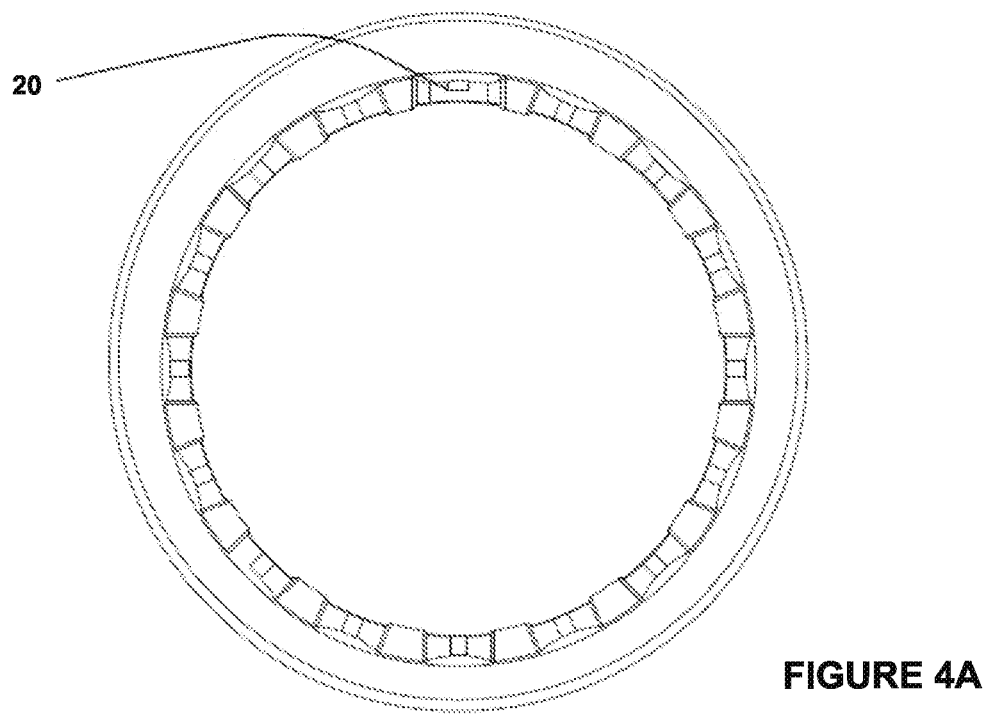
FIG. 4A shows a front view of a flange containing teeth.
Figure 4B:
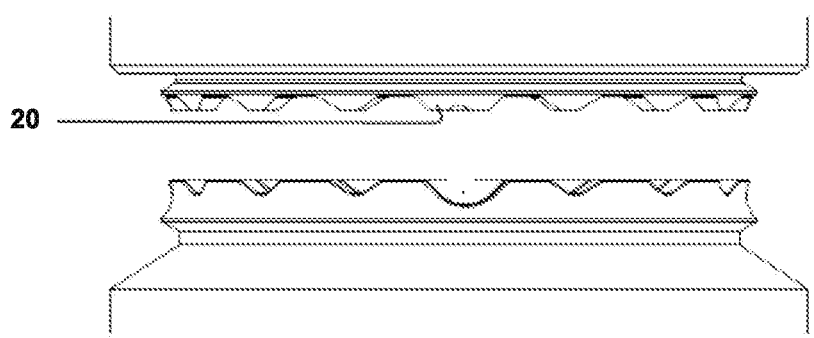
FIG. 4B shows a side view of the flange containing teeth and a flange containing cavities.
Figure 5A:
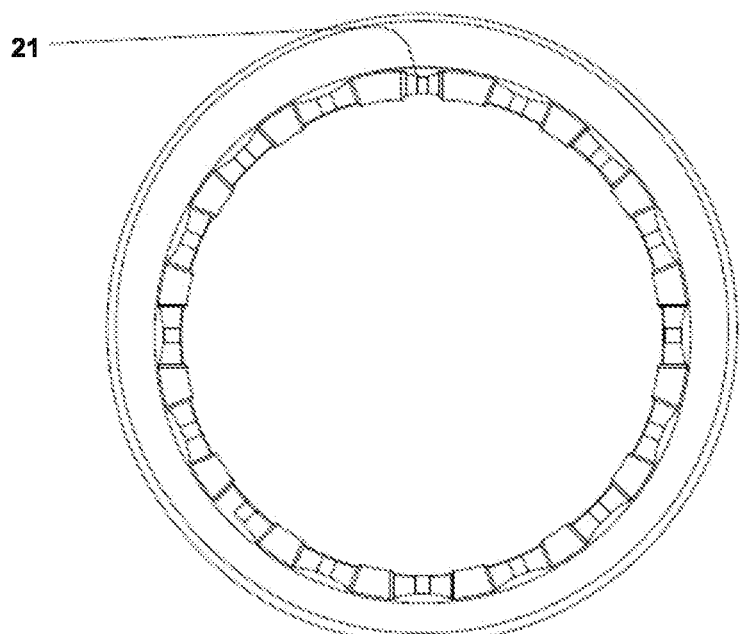
FIG. 5A shows a front view of a flange containing teeth.
Figure 5B:
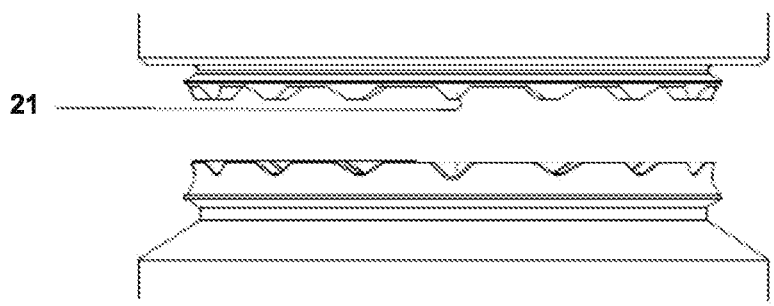
FIG. 5B shows a side view of the flange containing teeth and a flange containing cavities.
Figure 6A:
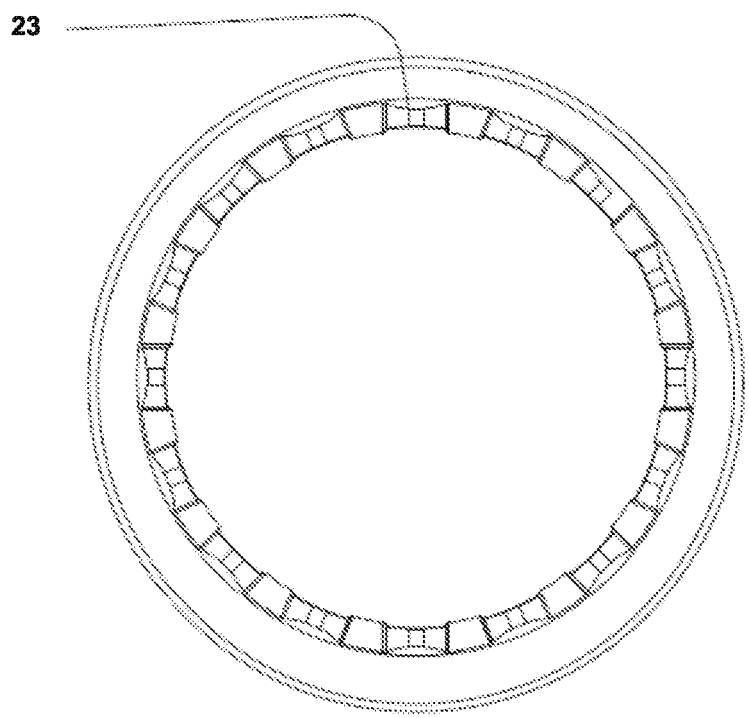
FIG. 6A shows a front view of a flange containing teeth.
Figure 6B:
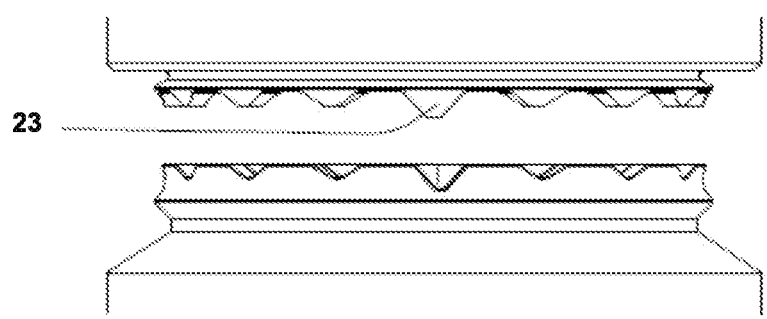
FIG. 6B shows a side view of the flange containing teeth and a flange containing cavities.
Figure 7A:
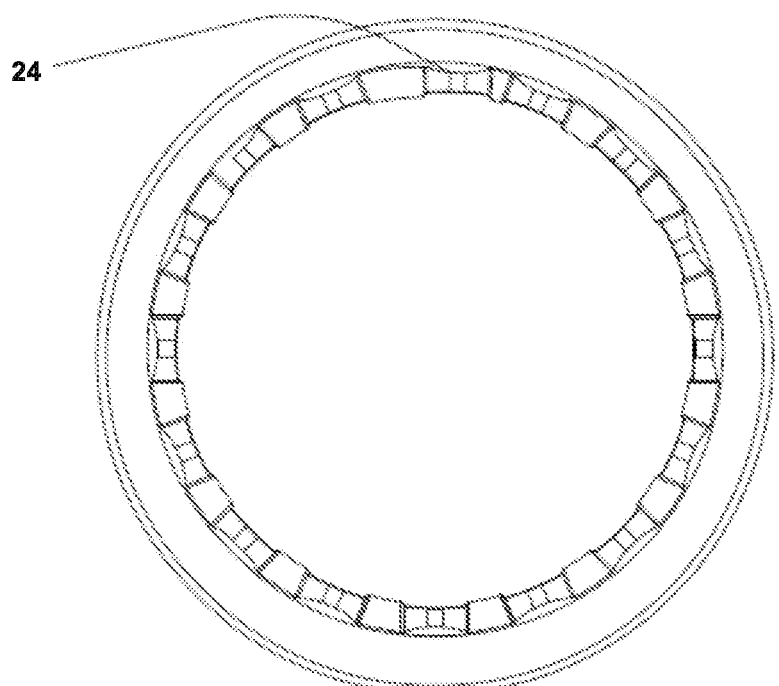
FIG. 7A shows a front view of a flange containing teeth.
Figure 7B:
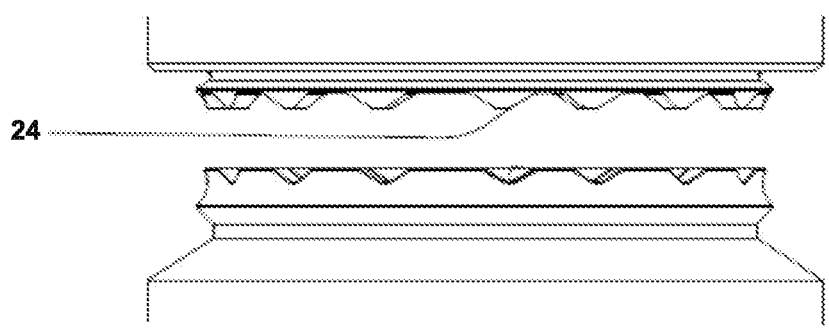
FIG. 7B shows a side view of the flange containing teeth and a flange containing cavities.

Referring to FIGS. 4A and 4B, in an embodiment one of the teeth 20 is wider than the remaining teeth. Referring to FIGS. 5A and 5B, in an embodiment one of the teeth 21 is narrower than the remaining teeth. Referring to FIGS. 6A and 6B, in an embodiment one of the teeth 23 has a non-uniform (greater) height than the remaining teeth. Referring to FIGS. 7A and 7B, in an embodiment one of the teeth 24 has a non-uniform distance from adjacent teeth.

The invention claimed is:
1. A releasable joint assembly for a joint, the releasable joint assembly comprising:
  a first component comprising a first annular flange, the first annular flange comprising a first contact surface and a first outer surface, the first outer surface having a first curved recess surface, the first contact surface comprising teeth along a circumference of the first annular flange;

a second component comprising a second annular flange, the second annular flange comprising a second contact surface and a second outer surface, the second outer surface having a second curved recess surface, the second contact surface comprising cavities along a circumference of the second annular flange, the cavities for receiving the teeth;

a clamp for holding the first component and second component together, the clamp comprising a V-clamp having a curved bulge surface configured to fit in the first curved recess surface and the second curved recess surface;

wherein the teeth are at a first angle relative to the first contact surface and the cavities are at a second angle relative to the second contact surface, the first angle and the second angle being substantially same.

2. The releasable joint assembly of claim 1, wherein the teeth comprise peaks and the cavities comprise bottoms; and
wherein the teeth and the cavities are configured so that, when the first component and the second component are held together, the peaks of the teeth do not touch the bottoms of the cavities.

3. The releasable joint assembly of claim 1, wherein the clamp is configured not to compress the first component and the second component when holding the first component and the second component together.

4. The releasable joint assembly of claim 1, wherein the first component and the second component comprise metals or metal alloy.

5. The releasable joint assembly of claim 1, wherein the first component and the second component comprise different materials having different hardnesses.

6. The releasable joint assembly of claim 1, wherein at least one of the first or the second component comprises a polymer material.

7. The releasable joint assembly of claim 1, wherein the first angle and the second angle are each between 15 degrees and 75 degrees.

8. The releasable joint assembly of claim 1, wherein one of the teeth is wider than others of the teeth.

9. A modular robot comprising the releasable joint assembly of claim 1.

10. The releasable joint assembly of claim 6, wherein the polymer comprises one of fiberglass, carbon fiber, polycarbonate, nylon, or polystyrene.

11. The releasable joint assembly of claim 1, wherein the first angle and the second angle are each between 20 degrees and 45 degrees.

12. The releasable joint assembly of claim 1, wherein the first angle and the second angle are each 30 degrees.

13. The releasable joint assembly of claim 1, wherein one of the teeth is more narrow than others of the teeth.

14. The releasable joint assembly of claim 1, wherein all but one of the teeth are spaced along the circumference of the first annular flange at a uniform distance from others of the teeth.

15. The releasable joint assembly of claim 1, wherein all but one of the teeth have a same height.

16. The releasable joint assembly of claim 1, wherein the clamp is a first clamp; and
wherein the releasable joint assembly comprises a second clamp for holding the first component and second component together, the second clamp comprising a V-clamp.

17. The releasable joint assembly of claim 16, further comprising a fastener to hold the first clamp and the second clamp together.

18. The releasable joint assembly of claim 1, wherein the V-clamp comprises two halves, each of the two halves covering 180 degrees of a perimeter of the first annual flange and the second annular flange when mated, the two halves being connected by screws.

19. A robot system comprising:
a robotic arm comprising a first component, a second component, and a clamp for holding the first component and the second component together, the clamp comprising a V-clamp, the robotic arm being movable in six degrees of freedom; and
a processor to provide position commands to the robotic arm to control movement of the robotic arm;
wherein the first component comprises a first annular flange, the first annular flange comprising a first contact surface and a first outer surface, the first outer surface having a first curved recess surface, the first contact surface comprising teeth along a circumference of the first annular flange;
wherein the second component comprises a second annular flange, the second annular flange comprising a second contact surface and a second outer surface, the second outer surface having a second curved recess surface, the second contact surface comprising cavities along a circumference of the second annular flange, the cavities for receiving the teeth;
wherein the teeth are at a first angle relative to the first contact surface and the cavities are at a second angle relative to the second contact surface, the first angle and the second angle being substantially same; and
wherein the V-clamp comprises a curved bulge surface configured to fit in the first curved recess surface and the second curved recess surface.

20. The robot system of claim 19, wherein the first component and the second component comprises a first robot joint for the robotic arm; and
wherein the robotic arm further comprises a spacer between the first joint and a second joint, the second joint having a same configuration as the first joint.

* * * * *